Feb. 26, 1946. J. J. SHEA 2,395,792

UNIVERSAL JOINT

Filed April 11, 1944

INVENTOR.
James J. Shea.
BY Walter C. Ross.
Attorney

Patented Feb. 26, 1946

2,395,792

UNITED STATES PATENT OFFICE 2,395,792

UNIVERSAL JOINT

James J. Shea, Springfield, Mass., assignor to Milton Bradley Company, Springfield, Mass., a corporation of Massachusetts Application April 11, 1944, Serial No. 530,462

2 Claims. (Cl. 64—17)

This invention relates to improvements in universal joints or flexible couplings such as are used to connect shafts and the like.

The principal objects of the invention are directed to improvements in universal joints or flexible couplings which is characterized by novel means for holding the pins thereof in place against accidental displacement.

In universal joint constructions where pins are employed for connecting the ears of the joint members to the central block member it has been usual to employ snap rings and the like to hold the pins in place but such have not been altogether satisfactory for various reasons.

According to this invention, means for retaining the pins in place is provided that includes a sleeve having portions overlying the pins that are rigidly and securely affixed to the joint members.

Various objects and advantages of the novel features of the invention will be hereinafter more fully referred to in connection with the accompanying description of the present preferred form of the invention.

Figure 1:
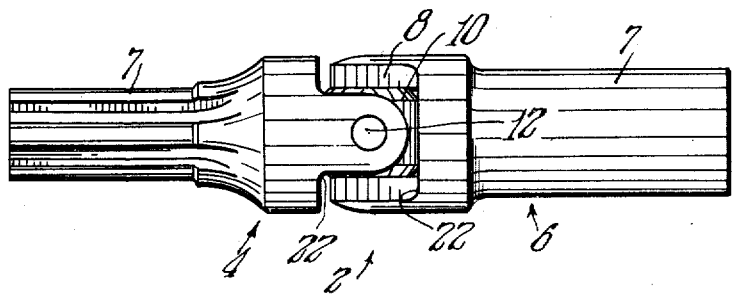
Fig. 1 is a side elevational view of one form of universal joint with which the invention may be used.

Referring now to the drawing more in detail, the invention will be fully described.

A universal joint is represented by 2 which includes members 4 and 6 each having a body part and shanks for connecting to shafts or the like, as shown. The shanks 7 of the members form no part of the invention and may be formed as may be desired.

The body members have spaced ears 8 between which is a central block 10. Pins such as 12 extend through the ears 8 and block 10 so as to pivotally connect the members 4 and 6 for relative movements as is customary with universal joints.

Figure 3:
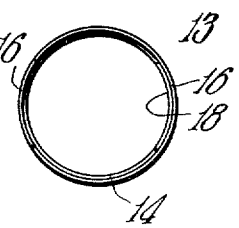
Figs. 2 and 3 are side and end elevational views of the novel retaining means of the invention.
Figure 2:
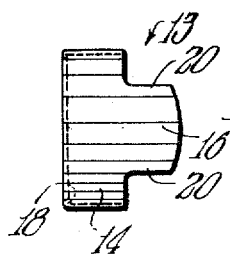
Figure 4:
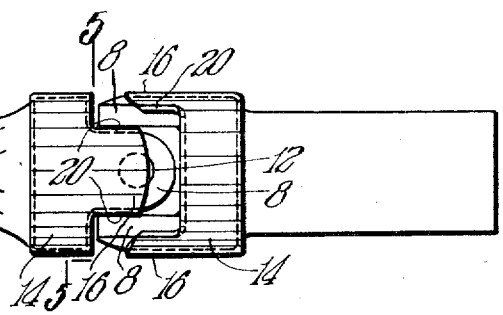
Fig. 4 is a view similar to Fig. 1 showing the retaining means of the invention applied thereto.
Figure 5:
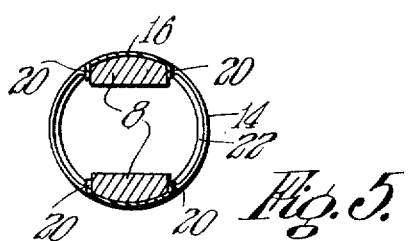
Fig. 5 is a sectional elevational view on the line 5—5 of Fig. 4.

The retainer 13 of the invention is shown in Figs. 2 and 3 and consists of a cylindrical part 14 with lugs 16 extending therefrom. The retainer may be made from metal that is rather thin and may be formed in various ways such as by a stamping, drawing, or other operation.

The inner diameter of the retainer is preferably such as to snugly receive the body of the joint member and it preferably has a lip 18 at its rear end. The lugs 16 of the retainer are sufficiently wider than the ears 8 of the joint member to provide lip portions 20 at the sides of the ears 16 for bending downwardly when the retainer is slipped over the body of the joint member.

A retainer, one for each joint member, is slipped over the joint member after assembly of the universal joint. The retainer lip 18 brings up against the rear or outer end of the body member while the lugs 16 overlie the ears 8 of the joint member. In this relation opposite side portions 20 of the lugs 16 of the retainer are turned downwardly against opposite sides of the ears 8 to provide lips 20 which not only snugly embrace the sides of the ears 8 but abut the inner end 22 of the body of the joint member.

The lugs 16 of the retainer overlying the ears of the joint member as well as the ends of the pin 12, in whole or in part, prevent the pin from being thrown out when the joint is rotated as is likely when a pin becomes loose or broken.

Thus an efficient and simple means is provided for retaining the pin in place which is not only economical to produce but is readily and easily applied to the joint.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A retainer for a universal joint member having a cylindrical portion with spaced pin receiving ears extending from the outer end thereof and provided with a shoulder at its inner end comprising in combination, a tubular body for slipping over the cylindrical portion of the member having a lip at its inner end for abutting the said shoulder thereof and provided with lugs extending from its outer end adapted to overlie the ears of said member, said lugs being somewhat wider than the ears of the member and adapted to be turned downwardly and inwardly to embrace the sides of said ears and outer end of the cylindrical portion of said member.

2. The combination of a universal joint member having a cylindrical portion provided with an inner end and an outer end from the latter of which extends a pair of spaced ears having a pin extending therethrough with retaining means for said pin comprising, a tubular member around said cylindrical portion of the member having a lip at its inner end abutting the inner end of said portion and lugs extending from its outer end overlying said ears and ends of the pin, opposite longitudinal sides of said lugs and adjacent end portions of said retainer being displaced downwardly and inwardly against the sides of said ears and outer end of the cylindrical member to provide lips that embrace the ears and about the outer end of said cylindrical portion, said lips preventing axial and rotative movements of the tubular member relative to the joint member.

JAMES J. SHEA.